United States Patent
Kim et al.

(10) Patent No.: US 11,113,997 B2
(45) Date of Patent: Sep. 7, 2021

(54) MULTI-VIEW DISPLAY DEVICE (71) Applicant: LG Display Co., Ltd., Seoul (KR)

(72) Inventors: Seok Kim, Paju-si (KR); HyeonHo Son, Goyang-si (KR); Hanchul Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 28 days.

(21) Appl. No.: 15/188,350

(22) Filed: Jun. 21, 2016

(65) Prior Publication Data

US 2016/0379394 A1 Dec. 29, 2016

(30) Foreign Application Priority Data

Jun. 26, 2015 (KR) .......................... 10-2015-0091475

(51) Int. Cl.
*G09G 3/00* (2006.01)
*H04N 13/31* (2018.01)
(Continued)

(52) U.S. Cl.
CPC ............. *G09G 3/003* (2013.01); *G02B 30/27* (2020.01); *H04N 13/31* (2018.05);
(Continued)

(58) Field of Classification Search
CPC ............ G06T 11/60; G09G 2300/0439; G09G 2340/10; G09G 2320/28
See application file for complete search history.

(56) References Cited

U.S. PATENT DOCUMENTS 5,831,765 A 11/1998 Nakayama et al.
2007/0018585 A1* 1/2007 Ijzerman ................. G09F 19/14
315/15
(Continued)

FOREIGN PATENT DOCUMENTS

CN 1617014 A 5/2005
CN 102759820 A 10/2012
(Continued)

OTHER PUBLICATIONS

The First Office Action dated Jan. 23, 2019, from the State Intellectual Property Office of People's Republic of China in counterpart Chinese application No. 201610481563.6. Note: US 2007/0018585A1, US 2009/0147178A1, US 2011/0234929A1, US 2009/0116094A1 and KR 20080058974A cited therein are already of record.

(Continued)

*Primary Examiner* — Kee M Tung
*Assistant Examiner* — Khoa Vu
(74) *Attorney, Agent, or Firm* — Morgan, Lewis & Bockius LLP (57) ABSTRACT

A multi-view display device is provided. The multi-view display device includes a display panel having a plurality of pixels disposed in a matrix arrangement, adjacent first and second pixels of the plurality of pixels constituting a group pixel; a barrier disposed on the display panel and having an opening that transmits light and a shielding portion that shields light; and a driver configured to selectively drive the display panel in a normal driving mode, a narrow viewing angle mode, and a multi-view mode by controlling signals applied to the first and second pixels. The opening is overlapped with the first pixel, and the shielding portion is overlapped with the second pixel.

13 Claims, 7 Drawing Sheets

(51) Int. Cl.
*G02B 30/27* (2020.01)
*H04N 13/30* (2018.01)

(52) U.S. Cl.
CPC ............... *G09G 2300/0452* (2013.01); *G09G 2320/028* (2013.01); *G09G 2320/0209* (2013.01); *H04N 2013/403* (2018.05)

(56) References Cited

U.S. PATENT DOCUMENTS

| | | | | |
|---|---|---|---|---|
| 2007/0296865 | A1* | 12/2007 | Mino | G09G 3/2007 348/571 |
| 2008/0058974 | A1 | 3/2008 | Nakamura et al. | |
| 2008/0117231 | A1* | 5/2008 | Kimpe | G09G 3/20 345/629 |
| 2008/0278466 | A1* | 11/2008 | Joo | G09G 3/3688 345/205 |
| 2009/0116094 | A1* | 5/2009 | Sugiyama | G02B 27/2214 359/245 |
| 2009/0140950 | A1* | 6/2009 | Woo | G02B 27/2214 345/4 |
| 2009/0147178 | A1* | 6/2009 | Ahn | G02B 27/2214 349/62 |
| 2010/0118045 | A1* | 5/2010 | Brown Elliott | G02B 27/2214 345/589 |
| 2010/0315324 | A1* | 12/2010 | Nam | G02F 1/133615 345/102 |
| 2011/0234929 | A1* | 9/2011 | Lin | G02B 27/2214 349/15 |
| 2012/0026204 | A1* | 2/2012 | Chun | G09G 3/003 345/690 |
| 2012/0139897 | A1* | 6/2012 | Butler | G06F 3/041 345/419 |
| 2014/0300712 | A1 | 10/2014 | Ma et al. | |
| 2014/0327694 | A1 | 11/2014 | Cao et al. | |
| 2015/0181203 | A1 | 6/2015 | Kim et al. | |

FOREIGN PATENT DOCUMENTS

| | | | | |
|---|---|---|---|---|
| CN | 104054123 A | | 9/2014 | |
| CN | 104732932 A | | 6/2015 | |
| JP | H11205822 A | | 7/1999 | |
| KR | 1020080058974 A | * | 12/2006 | ........... G02F 1/1323 |
| KR | 10-2008-0049451 A | | 6/2008 | |
| KR | 20080058974 A | * | 6/2008 | ........... G02F 1/133 |
| KR | 10-2009-0054748 A | | 6/2009 | |
| KR | 10-2009-0073895 A | | 7/2009 | |

OTHER PUBLICATIONS

Office Action dated May 26, 2021, issued in corresponding Korean Patent Application No. 10-2015-0091475.

* cited by examiner

MULTI-VIEW DISPLAY DEVICE

CROSS REFERENCE TO RELATED APPLICATIONS

This application claims the benefit of the Korean Patent Application No. 10-2015-0091475 filed on Jun. 26, 2015, which is hereby incorporated by reference for all purposes as if fully set forth herein.

BACKGROUND OF THE INVENTION

Field of the Invention

The present invention relates to a display device, and more particularly, to a multi-view display device.

Discussion of the Related Art

Recently, attention to information display has increased and the demand for portable information media has also increased. In this respect, development and commercialization of lightweight thin film flat panel display (FPD) devices to replace conventional cathode ray tubes (CRTs) have occurred.

Examples of flat panel display devices include liquid crystal display (LCD) devices, field emission display (FED) devices, plasma display panels (PDPs), organic light emitting display (OLED) devices, and electrophoresis display (EPD) devices.

Flat panel display devices have been designed as two-dimensional display devices for several simultaneous viewers. Flat panel display devices have been developed such that a viewer may view the same image information with good quality at any viewing position with respect to the screen.

However, it is sometimes required that several users should view different kinds of information from the same display device. This display device is advantageous in that a viewer may view a desired movie or image program as a personal device. For example, a driver who drives a car desires to view navigation data, whereas a fellow rider may desire to view a movie. For another example, each player may desire to view a game at one's own viewpoint in a computer game for two people or more. These conflicting requirements may be satisfied with two individual displays but such a solution would increase requirements for space and cost.

A multi-view display device has been suggested to solve this problem. The multi-view display device has been devised to allow a user to view different images when viewing one display device in different directions.

Figure 1:
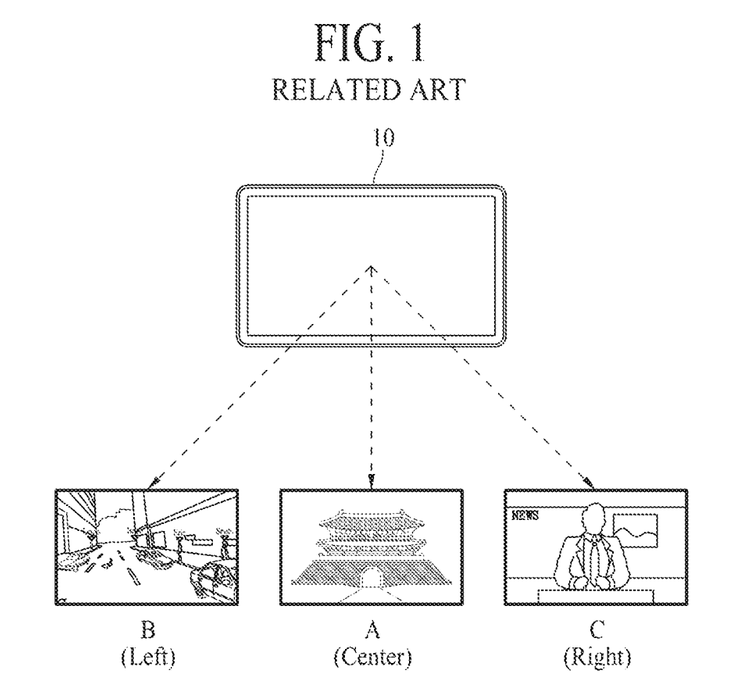
FIG. 1 is a view illustrating an example of a multi-view display device.

FIG. 1 illustrates an example of a multi-view display device.

As shown in FIG. 1, the multi-view display device 10 may allow a user to view different images in three different directions. The multi-view display device 10 may display different images at a center portion A, a left portion B, and a right portion C by using the technology of controlling a viewing angle. To this end, the multi-view display device 10 simultaneously displays three different images by splitting light emitted from a display panel into three light paths of center, left, and right using a parallax barrier (hereinafter, referred to as "barrier") or lenticular lens film.

However, the multi-view display device according to the related art has problems as follows.

First, in case of the multi-view display device based on a barrier, a luminance is deteriorated since an aperture ratio is lowered. If the display device is realized to allow a user to view different images in three different directions, a resolution is lowered to ⅓ and a picture quality is deteriorated.

In addition, the multi-view display device based on a lenticular lens has a low viewing angle and is vulnerable to spots or crosstalk. Also, in the same manner as the multi-view display device based on a barrier, if the display device is realized to allow a user to view different images in three different directions, a resolution is lowered to ⅓ and a picture quality is deteriorated.

SUMMARY

Accordingly, the present invention is directed to a multi-view display device that substantially obviates one or more problems due to limitations and disadvantages of the related art.

An object of the present invention is to provide a multi-view display device that improve picture quality with increased resolution and luminance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a multi-view display device comprises a display panel having a plurality of pixels disposed in a matrix arrangement, adjacent first and second pixels of the plurality of pixels constituting a group pixel; a barrier disposed on the display panel and having an opening that transmits light and a shielding portion that shields light; and a driver configured to selectively drive the display panel in a normal driving mode, a narrow viewing angle mode, and a multi-view mode by controlling signals applied to the first and second pixels, wherein the opening is overlapped with the first pixel, and the shielding portion is overlapped with the second pixel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to exemplary embodiments of the present invention, examples of which are illustrated in the accompanying drawings. Wherever possible, the same reference numbers will be used throughout the drawings to refer to the same or like parts.

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

A multi-view display device may be realized based on a flat panel display device, such as a liquid crystal display (LCD) device, a field emission display (FED) device, a plasma display panel (PDP), an organic light emitting display (OLED), and an electrophoresis display (EPD) device. In the following embodiments, although the liquid crystal display device will be described as an example of the flat panel display device, it is to be understood that the multi-view display device of the present invention is not limited to a liquid crystal display device.

Figure 2:
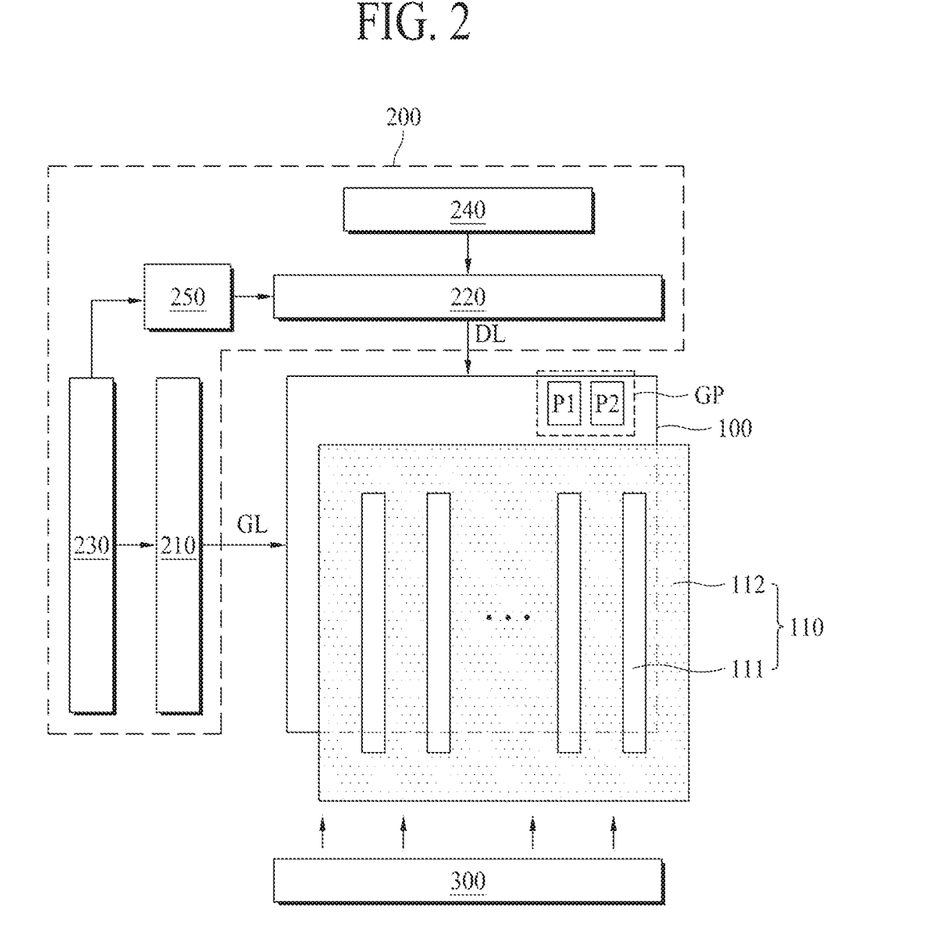
FIG. 2 is a schematic view illustrating a multi-view display device according to an example embodiment of the present invention.
Figure 3:
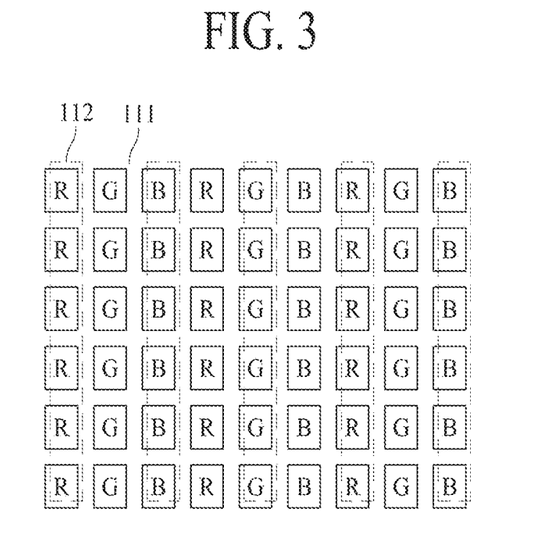
FIG. 3 is a plane view illustrating a color pixel structure and an alignment structure of a barrier according to an example embodiment of the present invention.
Figure 4:
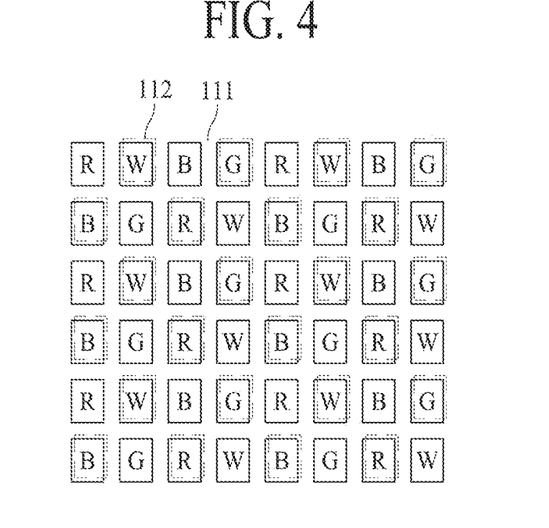
FIG. 4 is a plane view illustrating a color pixel structure and an alignment structure of a barrier according to another example embodiment of the present invention.

FIG. 2 is a schematic view illustrating a multi-view display device according to an example embodiment of the present invention. FIG. 3 is a plane view illustrating a color pixel structure and an alignment structure of a barrier according to an example embodiment of the present invention. FIG. 4 is a plane view illustrating a color pixel structure and an alignment structure of a barrier according to another example embodiment of the present invention.

As shown in FIG. 2, the multi-view display device according to an example embodiment of the present invention includes a display panel 100 for displaying an image, a driver 200 for driving the display panel 100, and a backlight unit 300 for supplying light to the display panel 100. The display panel 100 may be selectively driven by the driver 200 in a normal driving mode, a narrow viewing angle mode, and a multi-view mode. The normal driving mode is for a general situation to display an image and corresponds to a broad viewing angle mode. The narrow viewing angle mode corresponds to a privacy protection mode in which only a user who views the display panel 100 in a front direction may view an image and a user who views the display panel 100 from a left side or right side views a black image. The multi-view mode is a mode in which a user who views the display panel 100 in a front direction may view a first image and a user who views the display panel 100 at a left side or right side views a second image.

In realizing the multi-view mode, because a first image or a second image is provided from a center area, a left area, and a right area where the display panel 100 is viewed using first and second pixels, luminance and resolution may be increased as compared to those of the related art, thereby improving picture quality. To this end, the elements according to an example embodiment of the present invention will be described in detail.

The display panel 100 includes a plurality of pixels P of which areas are partitioned by gate lines GL and data lines DL that cross each other. The plurality of pixels P constituting the display panel 100 are arranged in a matrix arrangement of rows and columns, wherein each pixel P includes red, green, and blue color pixels R, G, and B for displaying colors, and one group pixel GP includes two pixels P adjacent to each other in a horizontal direction. For example, the group pixel GP may include a first pixel P1 and a second pixel P2.

The first pixel P1 provides a first image to a user who views the display panel at the center when the multi-view display device is driven in the multi-view mode. The second pixel P2 provides a second image to a user who views the display panel at the left side or right side when the multi-view display device is driven in the multi-view mode.

Here, embodiments of the present invention are not limited to red, green, and blue R, G, and B color pixels. That is, the pixels P may be comprised of red, green, blue, and white R, G, B, and W color pixels, or may be comprised of combinations of various color pixels not mentioned herein.

A thin film transistor TFT having a gate electrode, an active layer, a source electrode, and a drain electrode is arranged at each portion where the gate lines GL cross the data lines DL. A liquid crystal material equivalent to a liquid crystal cell Clc is filled in each pixel P, and a storage capacitor Cst for uniformly maintaining a voltage charged in the liquid crystal cell Clc is formed.

The display panel 100 displays an image in each pixel P in accordance with scan signals sequentially supplied to the gate lines GL and image signals supplied to the data lines DL.

The thin film transistor TFT provided for each pixel P is turned on if the scan signals are supplied to the gate lines GL and charges the image signals, which are received in the data lines DL, in the liquid crystal cell Clc. The image signals charged in the liquid crystal cell Clc of each pixel P are maintained by the storage capacitor Cst for one frame period.

Meanwhile, a barrier 110 is arranged on a front surface or rear surface of the display panel 100. The barrier 110 includes an opening 111 and a shielding portion 112. The opening 111 of the barrier 110 is disposed in some area of the group pixel GP to transmit light, and the shielding portion 112 is disposed in the other area of the group pixel GP to shield light.

The opening 111 of the barrier 110 is arranged in an area corresponding to one pixel P of the group pixel GP, and the shielding portion 112 is arranged in an area corresponding to the other pixel P of the group pixel GP alternately with the opening 111. For example, the opening 111 may be arranged to overlap the first pixel P1, and the shielding portion 112 may be arranged to overlap the second pixel P2. Therefore, if the display panel 100 is driven in the multi-view mode, the first image displayed from the first pixel P1 may be provided to a user who views the display panel 100 at the center through the opening 111, and the second image displayed from the second pixel P2 may be provided to another user who views the display panel 100 at the left or right side through the opening 111.

FIG. 2 shows that the opening 111 and the shielding portion 112 of the barrier 110 are arranged alternately in a stripe pattern. This position of the opening 111 and the shielding portion 112 is applied to a case where the pixels P constituting the display panel 100 are arranged in a stripe pattern of red, green, and blue color pixels R, G, and B as shown in FIG. 3.

However, various patterns may be applied to the arrangement of the opening 111 and the shielding portion 112 in accordance with various matters, such as a range that sets a narrow viewing angle or a broad viewing angle and an interval between the barrier 110 and the pixel P. For example, as shown in FIG. 4, if the pixels P constituting the display panel 100 include red, green, blue, and white R, G, B, and W color pixels, the opening 111 and the shielding portion 112 may be shifted every horizontal line.

In addition to the arrangements shown in FIGS. 3 and 4, various modifications may be made in the arrangement of the opening 111 and the shielding portion 112 of the present invention to prevent the opening 111 from being arranged to correspond to a specific color pixel only.

The driver 200 selectively drives the normal driving mode, the narrow viewing angle mode and the multi-view mode by controlling the signal applied to each pixel P of the group pixel GP constituting the display panel 100.

The driver 200 includes a gate driver 210, a data driver 220, a timing controller 230, a gamma voltage generator 240, and a signal converter 250, wherein the gate driver 210 and the data driver 220 respectively drive the gate lines GL and the data lines DL of the display panel 100.

The gate driver 210 sequentially supplies scan signals to the gate lines GL in accordance with a gate control signal supplied from the timing controller 230.

The data driver 220 converts pixel data (gray level) input from the timing controller 230 through the signal converter 250 to the image signal in response to a data control signal supplied from the timing controller 230. Also, the data driver 220 supplies the converted image signal to the data lines DL. In this case, the image signal is a gamma voltage, which is selected to correspond to externally input red, green, and blue pixel data, among gamma voltages supplied from the gamma voltage generator 240.

The timing controller 230 outputs externally input red, green, and blue pixel data, and generates a gate control signal and a data control signal, which respectively control driving timing of the gate driver 210 and the data driver 220 by using vertical and horizontal synchronization signals Vsync and Hsync and clock CLK.

The gamma voltage generator 240 generates gamma voltages required for digital/analog conversion of the data driver 220 within a gray scale range and supplies the generated gamma voltages to the data driver 220.

The signal converter 250 recognizes one mode selected from the normal driving mode, the narrow viewing angle mode and the multi-view mode, and selectively changes pixel data output to the data driver 220 per pixel or color pixel in accordance with the recognized mode. Therefore, the image signal applied from the data driver 220 to each pixel P of the display panel 100 is selectively changed.

The backlight unit 300 includes a lamp, such as a cold cathode fluorescent lamp, or an external electrode fluorescent lamp, or LED as a light source, and supplies light toward the display panel 100. The backlight unit 300 may be a direct type where a light source is arranged below the display panel 100, or may be an edge type where a light source is arranged at a side of the display panel 100.

Hereinafter, the operation of the display panel 100 for each of the normal driving mode, the narrow viewing angle mode, and the multi-view mode will be described.

Figure 5:
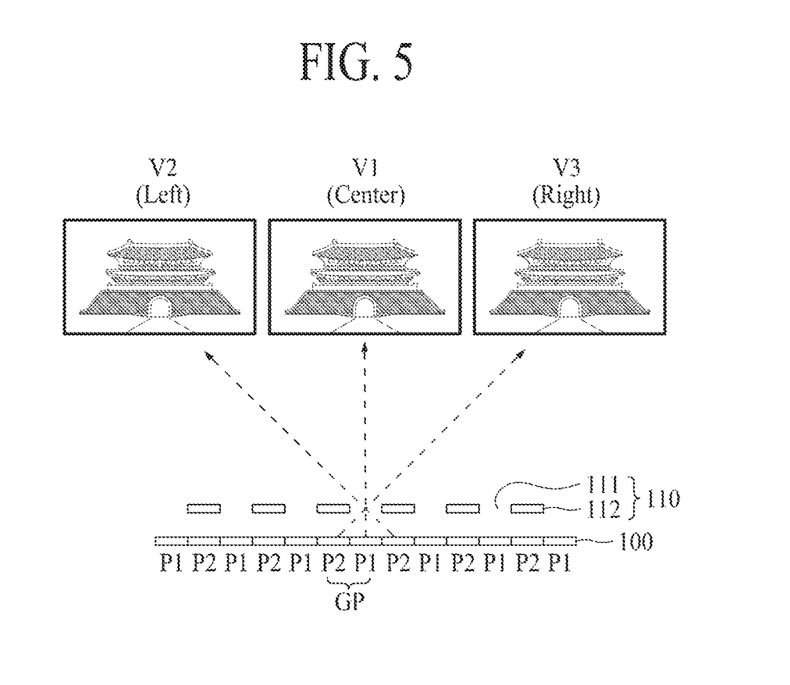
FIG. 5 is a view illustrating an example display panel according to FIG. 2 operated in a normal driving mode.

FIG. 5 is a view illustrating an example display panel according to FIG. 2 operated in a normal driving mode.

In FIG. 5, the first and second pixels P1 and P2 of the display panel 100 are arranged to be adjacent to each other in a horizontal direction, and are arranged alternately. The opening 111 of the barrier 110 is arranged to overlap the first pixel P1, and the shielding portion 112 of the barrier 110 is arranged to overlap the second pixel P2. In this case, the center of the opening 111 may be arranged to be aligned with the center of the first pixel P1.

With reference to FIG. 5, in the normal driving mode, the driver 200 supplies an image signal constituting a first frame to all of the first and second pixels P1 and P2 constituting the display panel 100. That is, since the same image signal is supplied to the first and second pixels P1 and P2, the same image is displayed. Then, the image displayed through the first pixel P1 is provided to a first viewing point V1 disposed at the center through the opening 111, and the image displayed through the second pixel P2 is provided to second and third viewing points V2 and V3 respectively disposed at left and right sides through the opening 111. Therefore, a viewer who views the display panel 100 views the same image regardless of a viewing zone or a viewing distance during the normal driving mode.

Figure 6:
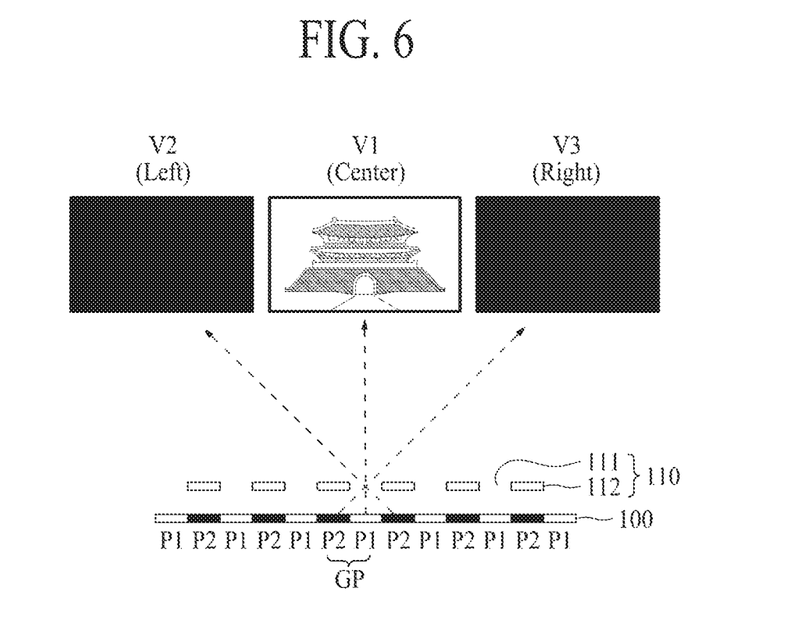
FIG. 6 is a view illustrating an example display panel according to FIG. 2 operated in a narrow viewing angle mode.

FIG. 6 is a view illustrating an example display panel according to FIG. 2 operated in a narrow viewing angle mode.

With reference to FIG. 6, in the narrow viewing angle mode, the driver 200 supplies an image signal constituting a first frame to first pixels P1. At the same time, the driver 200 supplies a black image signal to second pixels P2. That is, since the image signal constituting the first frame is supplied to the first pixels P1 but the black image signal is supplied to the second pixels P2 to display a black image, only the first pixels P1 of the first and second pixels P1 and P2 display an image. Then, the image displayed through the first pixels P1 is provided to a first viewing point V1 disposed at the center through the opening 111, and the image displayed through the second pixels P2 is provided to second and third viewing points V2 and V3 respectively disposed at left and right sides through the opening 111.

Therefore, during the narrow viewing angle mode, a viewer who views the display panel 100 may view an image only when viewing the display panel 100 at the center, and views a black image when viewing the display panel 100 at a left or right side. The narrow viewing angle mode may be used as a privacy protection function.

Figure 7:
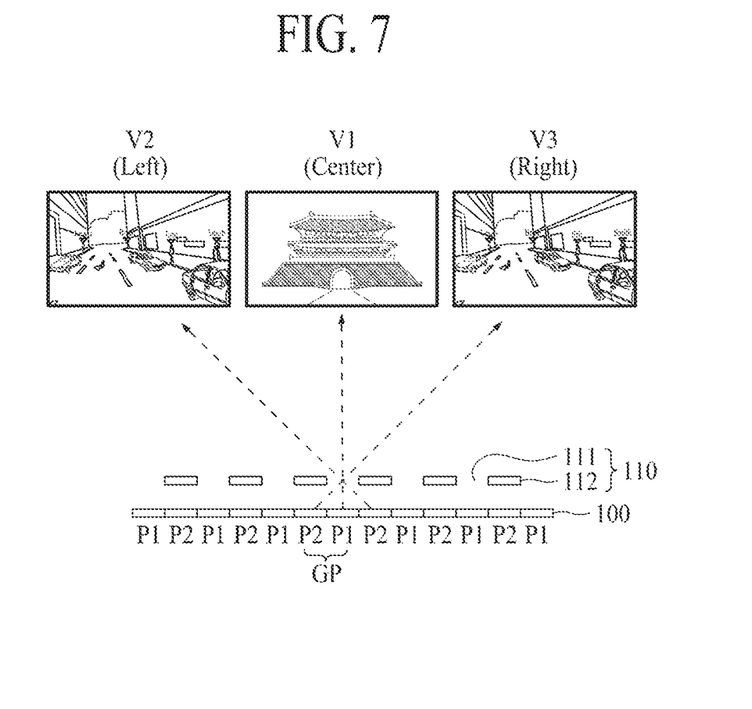
FIG. 7 is a view illustrating an example display panel according to FIG. 2 operated in a multi-view mode.

FIG. 7 is a view illustrating an example display panel according to FIG. 2 operated in a multi-view mode.

With reference to FIG. 7, in the multi-view mode, the driver 200 supplies a first image signal constituting a first frame to first pixels P1. At the same time, the driver 200 supplies a second image signal to second pixels P2. That is, different image signals constituting the first frame are supplied to the first and second pixels P1 and P2. Therefore, the first and second pixels P1 and P2 display their respective images different from each other. Then, the first image displayed through the first pixels P1 is provided to a first viewing point V1 disposed at the center through the opening 111, and the second image displayed through the second pixels P2 is provided to second and third viewing points V2 and V3 respectively disposed at left and right sides through the opening 111.

Therefore, during the multi-view mode, a viewer who views the display panel 100 views respective images different from each other for a case where the viewer views the display panel 100 at the center and a case where the viewer views the display panel 100 at the left or right side. In one embodiment of the present invention, an image is converted in accordance with a variable viewing position, whereby attention of consumers may be concentrated on the multi-view mode display device according to the present invention when the corresponding display device is used for street advertisement.

In accordance with embodiments of the present invention, luminance and resolution may be improved as compared the multi-view mode according to the related art as will be described in more detail as follows.

In the multi-view display device according to the related art, all pixels are split into first to third pixels to display different images in three different directions. That is, the multi-view display device according to the related art includes a first pixel for providing a first image to a first viewing point, a second pixel for providing a second image to a second viewing point, and a third pixel for providing a third image to a third viewing point. Although this related art is advantageous in that each image is provided to each viewing point, problems occur in that resolution is reduced to ⅓ and an aperture ratio of the barrier is reduced to cause low luminance.

In contrast, according to an example embodiment of the present invention, in realizing the multi-view mode, all pixels are split into first and second pixels P1 and P2, thereby increasing resolution for displaying one viewing point. Also, according to an example embodiment of the present invention, because an interval of the opening 111 of the barrier 110 may be increased, luminance may be improved. In this way, during the multi-view mode, resolution is improved and an aperture ratio is improved, thereby increasing luminance.

Figure 8:
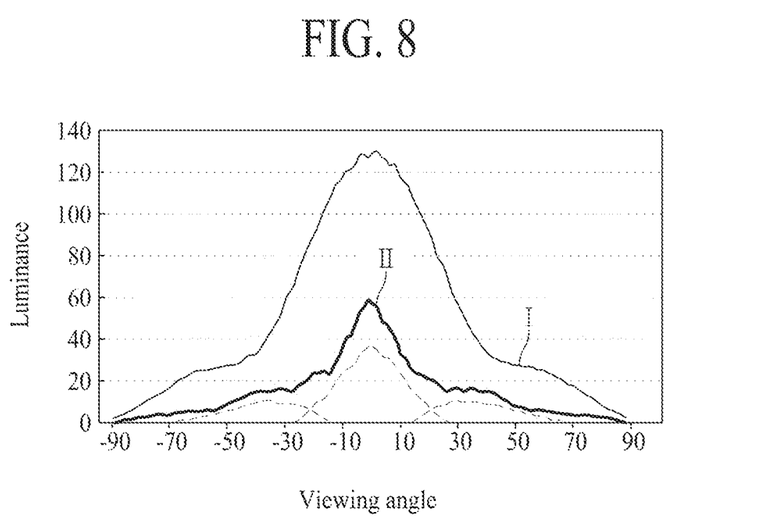
FIG. 8 is a graph illustrating experiment results measuring luminance according to the related art and luminance according to an example embodiment of the present invention.

FIG. 8 is a graph illustrating experiment results measuring luminance according to the related art and luminance according to an example embodiment of the present invention.

In FIG. 8, curve 'I' represents data obtained by measuring luminance according to a viewing angle during a normal driving mode. Curve 'II' represents data obtained by measuring luminance according to a viewing angle during a multi-view mode according to an example embodiment of the present invention. The curve represented by a dotted line represents data obtained by measuring luminance according to a viewing angle during a multi-view mode according to the related art.

As shown in FIG. 8, the luminance measured during the multi-view mode has luminance efficiency of 45%, approximately, as compared with the normal driving mode. This numerical value represents that luminance efficiency is improved by as much as 55% compared with luminance efficiency of the related art.

For reference, the experiment measured in FIG. 8 has been performed for display panel 100 that is a 55 inch UHD (Ultra-HD) grade (3840×2160) display, of which a rear distance is designed at 650 μm such that five different viewing points are formed.

As described above, according to the multi-view display device of an embodiment of the present invention, in realizing the multi-view mode, all pixels are split into first and second pixels P1 and P2 to improve resolution and luminance of an image, whereby an image of high quality may be provided. In realizing the multi-view display device, the barrier 10 may be arranged on the front surface or rear surface of the display panel 100 as described above.

Hereinafter, the structure of the multi-view display device of the present invention based on the position of the barrier 110 will be described in more detail for each of the embodiments.

Figure 9:
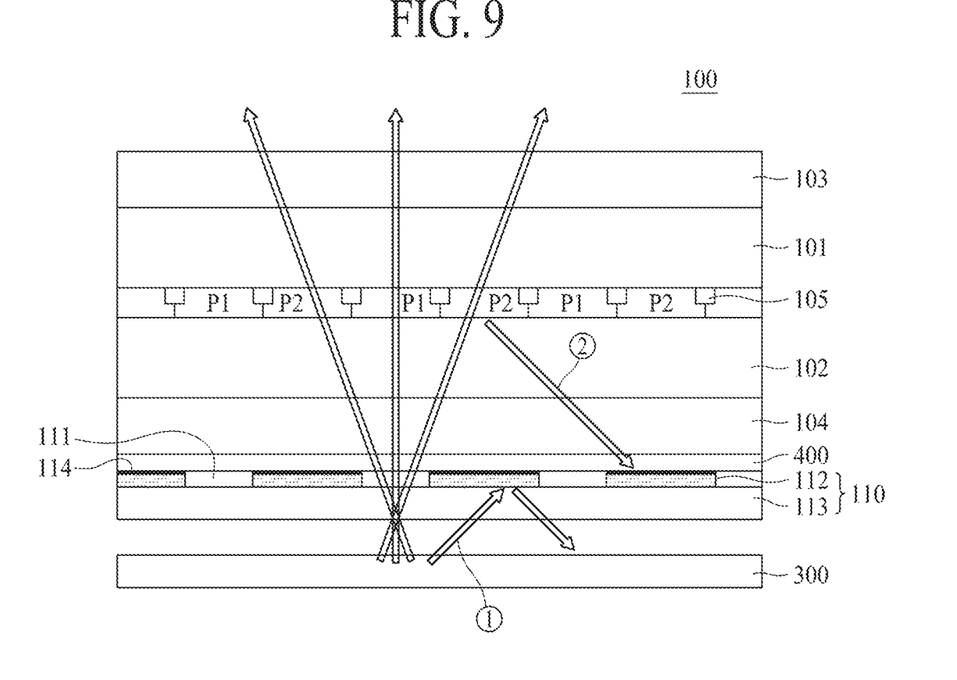
FIG. 9 is a cross-sectional view illustrating a structure of a multi-view display device according to a first example embodiment of the present invention.

FIG. 9 is a cross-sectional view illustrating a structure of a multi-view display device according to a first example embodiment of the present invention.

As shown in FIG. 9, the display panel 100 in accordance with a first example embodiment may include an upper substrate 101, a lower substrate 102, an upper polarizing member 103 arranged on the upper substrate 101, a lower polarizing member 104 arranged below the lower substrate 102, and a liquid crystal layer filled between the upper and lower substrates 101 and 102. The upper substrate 101 may include a color filter, a common electrode, and a black matrix 105. The common electrode may be arranged in the lower substrate 102 in accordance with a liquid crystal driving mode of the display panel 100. The upper substrate 101 converts incident light, which has transmitted a liquid crystal layer, to predetermined color light by using a color filter and emits the converted color light to the outside.

Signal lines, such as a plurality of gate lines GL and a plurality of data lines DL, are disposed in the lower substrate 102. A thin film transistor TFT is disposed at a portion where the gate line GL crosses the data line DL. The thin film transistor TFT is connected to a pixel electrode arranged in each pixel. The pixel electrode applies an electric field to the liquid crystal layer together with the common electrode to which a common voltage is supplied. The thin film transistor TFT supplies an image signal supplied from the data line DL to the pixel electrode in response to a scan signal supplied from the gate line GL. The liquid crystal layer controls light transmittance in response to a differential voltage between a data voltage based on the image signal applied to the pixel electrode and the common voltage applied to the common electrode.

A pad portion connected to each signal line is disposed at one edge of the lower substrate 102, and a printed circuit board connected to the driver 200 may be bonded to the pad portion. The gate driver 210 for supplying a scan signal to the gate line GL may be disposed in a non-display area of one side or both sides of the lower substrate 102. The gate driver 210 is disposed by the same process as that of the thin film transistor TFT of each pixel, whereby the gate driver 210 is connected to each gate line GL.

The upper polarizing member 103 may include a polarizing film attached to an upper portion of the upper substrate 101, polarizing color light emitted to the outside by transmitting the upper substrate 101. However, the upper polarizing member 103 of another embodiment may include an upper polarizing film attached to an upper surface of the upper substrate 101, polarizing color light emitted to the outside by transmitting the upper substrate 101, and a retarder film attached to an upper surface of the upper polarizing film, splitting three-dimensional images, that is, left-eye image and right-eye image, which are displayed on the display panel 100, into different polarizing states.

The lower polarizing member 104 may include a polarizing film attached to a lower portion of the lower substrate 102, polarizing light irradiated from the backlight unit 300 to the display panel 100. The barrier 110 according to the first example embodiment may be attached to a rear surface of the lower polarizing member 104 using a transparent adhesive film 400 such as optical clear adhesive (OCA).

The barrier 110 includes a base film 113 and barrier patterns 112 arranged on the base film 113 at a specific interval. In this case, the barrier patterns 112 become the aforementioned shielding portion 112, and a slit 111 between the barrier patterns 112 becomes the aforementioned opening 111.

A reflective layer, which may reflect light, may be disposed between the base film 113 and the barrier pattern 112. The reflective layer may be made of Al, AlNd, Ag alloy, Cr, Cu, Mo, Ti, white ink, etc. The reflective layer serves to reduce light loss due to the barrier 110 by reflecting light (light which advances along a path of ① in FIG. 9), which is directed toward the barrier patterns 112, among light emitted from the backlight unit 300. In other words, the reflective layer reduces light loss caused by the barrier 110 using recycling effect for reflecting incident light, and as a result improves luminance of the display device.

Meanwhile, the barrier pattern 112 may be made of a metal material, such as Al, AlNd, Ag alloy, Cr, and Cu for the above recycling effect.

If the barrier pattern 112 is made of a metal material for reflecting light as above, like light that advances along a path of ② in FIG. 9, light that has passed through the opening 111 of the barrier 110 may be reflected in a metal line (for example, gate line) disposed in the lower substrate 102 and then directed toward the barrier pattern 112. However, the light directed toward the barrier pattern 112 above the barrier pattern 112 may be reflected in the upper surface 114 of the barrier pattern 112, and then picture quality may be deteriorated.

To solve the problem, according to the first example embodiment of the present invention, if the barrier pattern 112 is made of a metal material for reflecting light, the upper surface 114 of the barrier pattern 112 is surface-treated to shield light. For example, the upper surface of the barrier pattern 112 may be oxidized to shield light.

Figure 10:
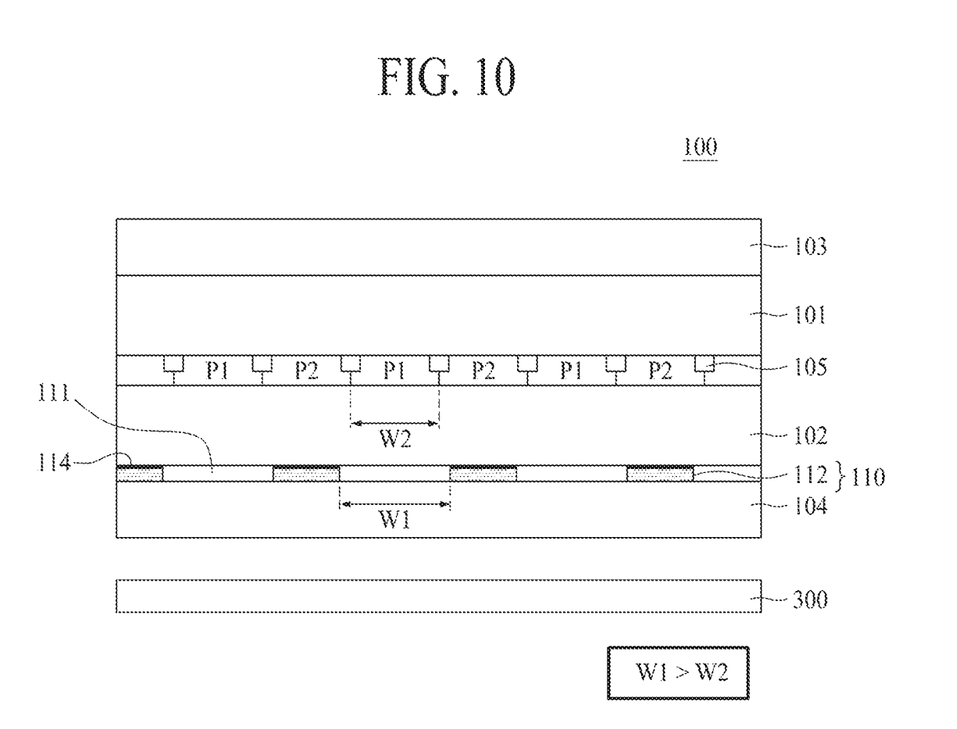
FIG. 10 is a cross-sectional view illustrating a modified example of a position of a barrier in the first example embodiment.

Although the barrier 110 according to the first example embodiment, as shown in FIG. 9, may be attached to the rear surface of the lower polarizing member 104 in a film type, the barrier 100 may directly be formed on the lower polarizing member 104 as shown in FIG. 10. Here, FIG. 10 is a cross-sectional view illustrating a modified example of a position of a barrier in the first example embodiment.

Figure 11:
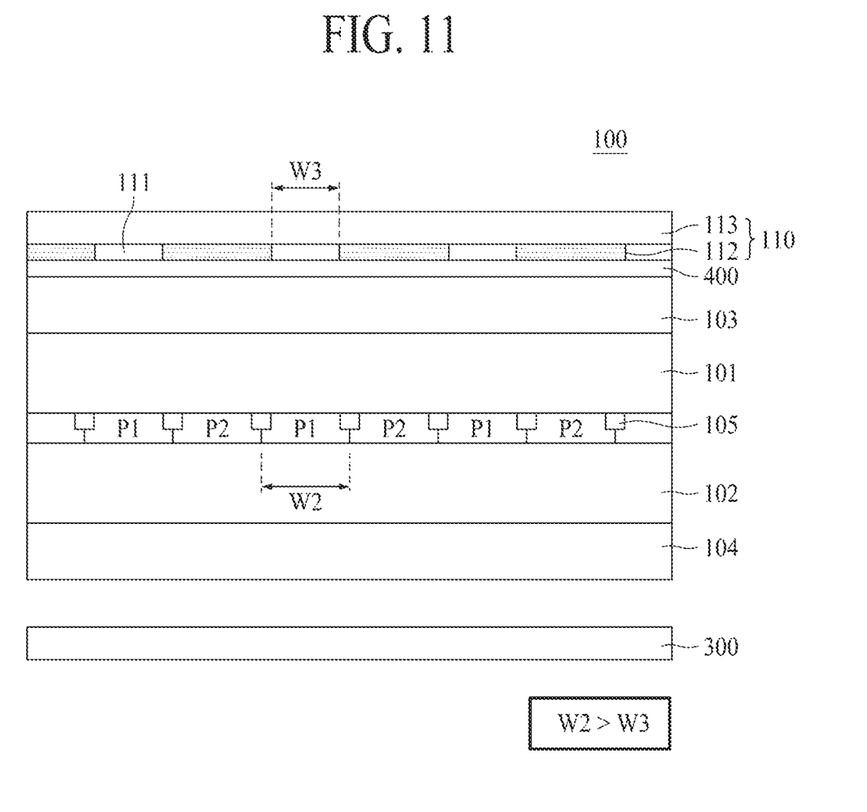
FIG. 11 is a cross-sectional view illustrating a structure of a multi-view display device according to a second example embodiment of the present invention.

FIG. 11 is a cross-sectional view illustrating a structure of a multi-view display device according to a second example embodiment of the present invention.

Unlike the first example embodiment, a formation position of the barrier 110 is changed in the multi-view display device according to the second example embodiment. Therefore, elements of the second example embodiment, which are varied from those of the first embodiment, will now be described. Description of elements similar to those of the first example embodiment will be omitted.

With reference to FIG. 11, the barrier 110 according to the second example embodiment is attached to an upper portion of the upper polarizing member 103 using a transparent adhesive film 400. The barrier 110 includes a base film 113 and barrier patterns 112 arranged on the base film 113 at a specific interval. In this case, the barrier patterns 112 become the aforementioned shielding portion 112, and a slit 111 between the barrier patterns 112 becomes the aforementioned opening 111. The barrier pattern 112 is made of a material that may shield light. For example, the barrier pattern 112 may be formed by printing a black ink at a thickness of several μm.

A first interval of the opening 111 of the barrier 110 may be the same as a second interval of each of first and second pixels P1 and P2. However, the first and second intervals may be designed differently from each other to improve a viewing angle or a viewing zone. In more detail, an optimal viewing distance and an optimal viewing zone of the display panel 100 may be determined in accordance with a rear distance from the pixels P1 and P2 to the barrier 110, a distance between a left eye and a right eye of a viewer, and a difference between the first and second intervals.

According to one example embodiment, as shown in FIG. 11, if the barrier 110 is arranged on a front surface of the display panel 100, a better result is obtained with respect to the viewing angle and the viewing zone when the first interval W3 of the opening 111 of the barrier 110 is designed to be smaller than the second interval W2 of each of the first and second pixels. This is because an angle of light emitted from each pixel through the opening 111 of the barrier 110 is increased as the interval of the opening 111 of the barrier 110 becomes narrow if the barrier 110 is arranged on the front surface. Therefore, if the barrier 110 is arranged on the front surface of the display panel 100, the first interval W3 may be designed to be smaller than the second interval W2, thereby increasing the viewing zone.

Also, as shown in FIG. 10, if the barrier 110 is arranged on a rear surface of the display panel 100, a better result is obtained with respect to viewing angle and viewing zone when the first interval W1 of the opening 111 of the barrier 110 is designed to be greater than the second interval W2 of each of the first and second pixels P1 and P2. This is because an angle of light emitted from each pixel through the opening 111 of the barrier 110 is increased as the interval of the opening 111 of the barrier 110 becomes wide if the barrier 110 is arranged on the rear surface. Therefore, if the barrier 110 is arranged on the rear surface of the display panel 100, the first interval W1 may be designed to be greater than the second interval W2, thereby increasing the viewing zone.

Therefore, if the barrier 110 is arranged on the front surface of the display panel 100, the first interval of the opening 111 of the barrier 110 may be designed to be smaller than the second interval of each of the first and second pixels. Also, if the barrier 110 is arranged on the rear surface of the display panel 100, the first interval of the opening 111 of the barrier 110 may be designed to be greater than the second interval of each of the first and second pixels P1 and P2.

As described above, according to the multi-view display device of the present invention, in realizing the multi-view mode, all pixels are split into first and second pixels to improve resolution and luminance of an image, thereby providing an image of high quality.

It will be apparent to those skilled in the art that various modifications and variations can be made in multi-view display device according to the present invention without departing from the spirit or scope of the inventions. Thus, it is intended that the present invention cover the modifications and variations of this invention provided they come within the scope of the appended claims and their equivalents.

What is claimed is:

1. A multi-view display device, comprising:
   a display panel including a plurality of pixels disposed in a matrix arrangement, the plurality of pixels grouped into a first pixel group and a second pixel group, the first pixel group including a plurality of first pixels, the second pixel group including a plurality of second pixels;
   a barrier disposed on the display panel, the barrier including: and having
      openings that transmit light; and
      shielding portions that shield light; and
   a driver configured to selectively drive the display panel in a normal driving mode, a narrow viewing angle mode, and a multi-view mode by controlling signals applied to the first and second pixels,
   wherein the first and second pixels are alternately arranged in a horizontal direction of the matrix arrangement, such that each first pixel is adjacent to two second pixels in the horizontal direction, and each second pixel is adjacent to two first pixels in the horizontal direction,
   wherein the first and second pixels are alternately arranged in a vertical direction of the matrix arrangement, such that each first pixel is adjacent to two second pixels in the vertical direction, and each second pixel is adjacent to two first pixels in the vertical direction,
   wherein the openings are overlapped with the first pixels,
   wherein the shielding portions are overlapped with the second pixels,
   wherein the first and second pixels are shifted every horizontal line of the matrix arrangement,
   wherein the openings and the shielding portions are shifted every horizontal line of the matrix arrangement, whereby the openings and the shielding portions respectively overlap with every first and second pixel in the horizontal direction and in the vertical direction, such that the openings are arranged in a first diagonal direction and the shielding portions are arranged in a second diagonal direction to form a checkerboard pattern,
   wherein centers of each of the openings are aligned with respective centers of each of the first pixels relative to a direction perpendicular to the display panel, and
   wherein a first image that includes light from the first pixel through the opening is provided to a first viewing point corresponding to a center of the display panel at the center through the opening, and a second image that includes light from the second pixel through the opening is provided to second and third viewing points corresponding to positions to right and left sides of the display panel.

2. The multi-view display device of claim 1, wherein the driver is further configured to supply an image signal constituting a first frame to the first and second pixels in the normal driving mode.

3. The multi-view display device of claim 1, wherein the driver is further configured to:
   supply an image signal constituting a first frame to the first pixel; and
   simultaneously supply a black image signal to the second pixel in the narrow viewing angle mode.

4. The multi-view display device of claim 1, wherein, in the multi-view mode, the driver is further configured to:
   supply a first image signal constituting a first frame of the first pixel; and
   simultaneously supply a second image signal constituting a first frame of the second pixel.

5. The multi-view display device of claim 1, wherein:
   the barrier is arranged on a front surface of the display panel; and
   a first interval of each opening of the barrier is smaller than a second interval of each of the first and second pixels.

6. The multi-view display device of claim 1, wherein:
   the barrier is arranged on a rear surface of the display panel; and
   a first interval of each opening of the barrier is greater than a second interval of each of the first and second pixels.

7. The multi-view display device of claim 6, wherein the barrier includes:
   a base film;
   barrier patterns disposed on the base film at a specific interval; and
   a reflective layer disposed between the base film and the barrier pattern.

8. The multi-view display device of claim 6, wherein the barrier includes:
   a base film; and
   barrier patterns disposed on the base film at a specific interval and made of a metal material.

9. The multi-view display device of claim 8, wherein the metal material is made of any one selected from Al, AlNd, Ag alloy, Cr, Cu, Mo, and Ti.

10. The multi-view display device of claim 9, wherein an upper surface of the barrier patterns has an oxide film.

11. The multi-view display device of claim 8, wherein an upper surface of the barrier patterns is surface-treated to shield light.

12. The multi-view display device of claim 1, wherein all pixels are grouped into only the first pixel group and the second pixel group.

13. The multi-view display device of claim 1, wherein:
   each of the plurality of pixels emits one of four colors including red, green, blue, and white; and
   the first pixels in the vertical direction emit a first one of the four colors, and the second pixels in the vertical direction emit a second one of the four colors, such that pixels emitting the first one of the four colors and pixels emitting the second one of the four colors are alternately arranged in the vertical direction.

* * * * *